United States Patent
Masaki et al.

(10) Patent No.: US 12,403,429 B2
(45) Date of Patent: Sep. 2, 2025

(54) FILTER MEDIUM AND FILTER UNIT

(71) Applicant: NITTO DENKO CORPORATION, Osaka (JP)

(72) Inventors: Shunsuke Masaki, Osaka (JP); Masaaki Mori, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 598 days.

(21) Appl. No.: 17/600,439

(22) PCT Filed: Apr. 3, 2020

(86) PCT No.: PCT/JP2020/015381
§ 371 (c)(1),
(2) Date: Sep. 30, 2021

(87) PCT Pub. No.: WO2020/204177
PCT Pub. Date: Oct. 8, 2020

(65) Prior Publication Data
US 2022/0193618 A1    Jun. 23, 2022

(30) Foreign Application Priority Data

Apr. 4, 2019 (JP) .................. 2019-071843

(51) Int. Cl.
*B01D 69/02* (2006.01)
*B01D 69/10* (2006.01)
*B01D 69/12* (2006.01)
*B01D 71/36* (2006.01)

(52) U.S. Cl.
CPC .......... *B01D 69/02* (2013.01); *B01D 69/107* (2022.08); *B01D 69/1216* (2022.08); *B01D 71/36* (2013.01); *B01D 2239/0618* (2013.01); *B01D 2313/2062* (2022.08); *B01D 2325/0283* (2022.08)

(58) Field of Classification Search
CPC .. B01D 69/02; B01D 69/107; B01D 69/1216; B01D 71/36; B01D 2239/0618; B01D 2313/2062; B01D 2325/0283; B01D 39/163; B01D 2239/0233; B01D 2239/0668; B01D 2239/12; B01D 2239/1291; B01D 2313/2031; B01D 39/1692; B01D 2325/20; B01D 69/10; B01D 69/12; B01D 2239/0654; B01D 2239/1258; B01D 2325/02; B01D 39/1623; B01D 53/228; B01D 63/14; B32B 2262/0253; B32B 3/08; B32B 3/28; B32B 5/022; B32B 7/022; B32B 27/12; B32B 27/322; B32B 2250/04; B32B 2262/0284; B32B 2262/124; B32B 2307/554; B32B 2307/724; B32B 5/18
See application file for complete search history.

(56) References Cited

U.S. PATENT DOCUMENTS

| 10,071,334 | B2* | 9/2018 | Wada ................... B32B 27/304 |
| 2017/0128876 | A1 | 5/2017 | Shibuya et al. |
| 2017/0348626 | A1 | 12/2017 | Sakano et al. |
| 2018/0147522 | A1* | 5/2018 | Wada ................... B01D 71/36 |
| 2018/0264392 | A1* | 9/2018 | Niki ................... B01D 46/009 |
| 2019/0232211 | A1 | 8/2019 | Niki et al. |

FOREIGN PATENT DOCUMENTS

| JP | 2001-170424 | 6/2001 |
| JP | 2005-205305 | 8/2005 |
| JP | 2005-246233 | 9/2005 |
| JP | 2016-123972 | 7/2016 |
| JP | 2016-209869 | 12/2016 |
| JP | 2018-51544 | 4/2018 |

OTHER PUBLICATIONS

International Search Report issued in International Bureau of WIPO Patent Application No. PCT/JP2020/015381, dated Jun. 23, 2020, along with an English translation thereof.
Written Opinion of the International Searching Authority issued in International Bureau of WIPO Patent Application No. PCT/JP2020/015381, dated Jun. 23, 2020, along with an English translation thereof.
Extended European Search Report issued in European Patent Application No. 20783411.0, dated Nov. 14, 2022.
Europe, Communication pursuant to Article 94(3) EPC received in Applicant No. 20 783 411.0, dated Mar. 27, 2025.

* cited by examiner

*Primary Examiner* — Krishnan S Menon
*Assistant Examiner* — Tak L Chiu
(74) *Attorney, Agent, or Firm* — GREENBLUM & BERNSTEIN, P.L.C.

(57) ABSTRACT

A filter medium of the present disclosure has a laminate structure composed of a first polytetrafluoroethylene (PTFE) porous membrane, a first air-permeable supporting member, a second PTFE porous membrane, and a second air-permeable supporting member laminated in this order. The first PTFE porous membrane constitutes an exposed surface of the filter medium. A ratio of a transmittance of the first PTFE porous membrane to a transmittance of the second PTFE porous membrane is 100 or more. The filter medium of the present disclosure is a filter medium which includes the PTFE porous membranes, from which dust deposited on a surface over a period of use can be easily removed, and which has excellent reusability demonstrated by reduction of a filtration performance decrease caused by removal of dust.

6 Claims, 1 Drawing Sheet

FILTER MEDIUM AND FILTER UNIT

TECHNICAL FIELD

The present invention relates to a filter medium and a filter unit.

BACKGROUND ART

Filter mediums including a polytetrafluoroethylene (hereinafter referred to as "PTFE") porous membrane are used for various air-permeable filters such as air filters for clean rooms and dust filters for vacuum cleaners. Patent Literature 1 discloses a filter medium including a first PTFE porous membrane, a first air-permeable supporting member, a second PTFE porous membrane, and a second air-permeable supporting member, the first PTFE porous membrane constituting an exposed surface. Filter mediums are sometimes required of reusability so that they can be reused after removing dust deposited on their surfaces. When one exposed surface is constituted by a PTFE porous membrane as in the filter medium of Patent Literature 1, it is easy to remove dust deposited on the exposed surface.

CITATION LIST

Patent Literature

Patent Literature 1: JP 2016-209869 A

SUMMARY OF INVENTION

Technical Problem

Dust on an exposed surface can be removed by blowing the exposed surface or washing the exposed surface with water. Not a few users rub the exposed surface with a brush while blowing an exposed surface or washing an exposed surface with water. However, a PTFE porous membrane is such a thin membrane that the membrane is easily damaged by external force, and the damage decreases the filtration performance of a filter medium. Although there are filter mediums designed in consideration of removal of dust, no sufficient measure against additional use of a brush by users is currently applied to such filter mediums.

The present invention aims to provide a filter medium which includes a PTFE porous membrane, from which dust deposited on a surface over a period of use can be easily removed, and which has excellent reusability demonstrated by reduction of a filtration performance decrease caused by removal of dust.

Solution to Problem

The present invention provides a filter medium including:
a first PTFE porous membrane;
a first air-permeable supporting member;
a second PTFE porous membrane; and
a second air-permeable supporting member, wherein
the filter medium has a laminate structure composed of the first PTFE porous membrane, the first air-permeable supporting member, the second PTFE porous membrane, and the second air-permeable supporting member laminated in this order, and
the first PTFE porous membrane constitutes an exposed surface of the filter medium, and
a ratio $TR_1/TR_2$ of a transmittance $TR_1$ of the first PTFE porous membrane to a transmittance $TR_2$ of the second PTFE porous membrane is 100 or more,
where the transmittance $TR_1$ and the transmittance $TR_2$ are values determined by the following formulae from, respectively, collection efficiency $CE_1$ (unit: %) of the first PTFE porous membrane and collection efficiency $CE_2$ (unit: %) of the second PTFE porous membrane measured using monodisperse dioctyl sebacate particles having an average particle diameter of 0.1 μm at a permeate flow rate of 5.3 cm/sec:

transmittance $TR_1$ (%)=100−collection efficiency $CE_1$; and transmittance $TR_2$ (%)=100−collection efficiency $CE_2$.

In another aspect, the present invention provides a filter unit including:
the above filter medium of the present invention; and
a frame supporting the filter medium.

Advantageous Effects of Invention

In the filter medium of the present invention, an exposed surface of the filter medium is constituted by the PTFE porous membrane. Dust deposited on this surface can be removed more easily than dust deposited on the air-permeable supporting member. The filter medium is disposed such that the above exposed surface is upstream of the flow of gas permeating through the filter medium, so that dust deposited on the surface over a period of use is easily removed. Additionally, in the filter medium of the present invention, filtration performances expressed in terms of transmittances differ greatly between the first PTFE porous membrane and the second PTFE porous membrane, and the first PTFE porous membrane having a higher transmittance constitutes the above exposed surface. As a result, the second PTFE porous membrane having a low transmittance and sandwiched by the air-permeable supporting members to be less affected by external force secures the filtration performance of the filter medium, while the exposed surface being a surface on which dust is deposited can be constituted by the first PTFE porous membrane having a high transmittance and giving a small effect on the filtration performance of the filter medium even when slightly damaged by external force. In other words, in the filter medium of the present invention, the second PTFE porous membrane has the function of securing the filtration performance of the filtration medium, while the first PTFE porous membrane can have the function as an exposed layer (a layer on which dust is deposited and to which external force is applied during removal of dust) tolerating slight damage caused by external force. In the filter medium of the present invention, this function assignment to the first PTFE porous membrane and the second PTFE porous membrane reduces a filtration performance decrease caused by removal of dust.

DESCRIPTION OF EMBODIMENTS

Hereinafter, embodiments of the present invention will be described with reference to the drawings. The present invention is not limited to the following embodiments.

[Filter Medium]

Figure 1:
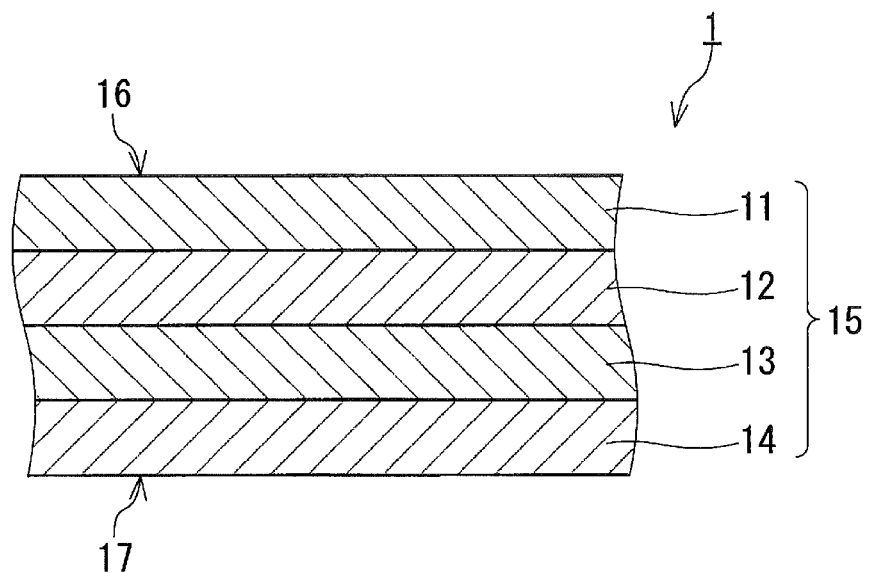
FIG. 1 is a cross-sectional view schematically showing an example of a filter medium of the present invention.

FIG. 1 shows an example of a filter medium of the present invention. A filter medium 1 shown in FIG. 1 includes a first PTFE porous membrane 11, a first air-permeable supporting member 12, a second PTFE porous membrane 13, and a second air-permeable supporting member 14. The filter medium 1 has a laminate structure 15 composed of the first PTFE porous membrane 11, the first air-permeable supporting member 12, the second PTFE porous membrane 13, and the second air-permeable supporting member 14 laminated in this order. The first PTFE porous membrane 11 constitutes one exposed surface 16 of the filter medium 1. The other exposed surface 17 of the filter medium 1 is constituted by the second air-permeable supporting member 14.

A ratio $TR_1/TR_2$ of a transmittance $TR_1$ of the first PTFE porous membrane 11 to a transmittance $TR_2$ of the second PTFE porous membrane 13 is 100 or more. If the ratio $TR_1/TR_2$ was less than 100, the above function assignment to the PTFE porous membranes 11 and 13 would be achieved imperfectly and thus removal of dust would cause a greater decrease in filtration performance of the filter medium. The ratio $TR_1/TR_2$ may be 300 or more, 400 or more, 440 or more, 500 or more, 1000 or more, 2500 or more, 5000 or more, 10000 or more, 25000 or more, 50000 or more, 75000 or more, 100000 or more, 110000 or more, 125000 or more, 150000 or more, 175000 or more, or even 190000 or more. The larger the ratio $TR_1/TR_2$ is, the more reliably a decrease in filtration performance of the filter medium caused by removal of dust is reduced. The upper limit of the ratio $TR_1/TR_2$ is, for example, 5000000 or less.

The transmittances $TR_1$ and $TR_2$ of the first PTFE porous membrane 11 and the second PTFE porous membrane 13 are values determined by the following formulae from collection efficiencies $CE_1$ and $CE_2$ (unit: %) of the PTFE porous membranes 11 and 13 measured using monodisperse dioctyl sebacate particles ("dioctyl sebacate" is hereinafter referred to as "DEHS") having an average particle diameter of 0.1 μm at a permeate flow rate of 5.3 cm/sec:

transmittance $TR_1$ (%)=100−collection efficiency $CE_1$; and transmittance $TR_2$ (%)=100−collection efficiency $CE_2$.

The collection efficiency CE of each PTFE porous membrane can be measured in the following manner. The PTFE porous membrane serving as an evaluation object is set in a holder having a vent hole (having a circular shape and an effective area of 100 cm²) in such a manner that the membrane blocks the vent hole. Then, a pressure difference is generated between one face and the other face of the holder so that air will permeate through the evaluation object in the vent hole. Next, the pressure difference is adjusted so that the linear flow velocity measured using a flowmeter for the air permeating through the evaluation object will be maintained at 5.3 cm/sec. After that, monodisperse DEHS particles having an average particle diameter of 0.1 μm are introduced into the air permeating through the evaluation object at a concentration of $10^4$ particles/cm³ or more. The concentration of the monodisperse DEHS particles included in the air having permeated through the evaluation object is measured using a particle counter disposed downstream of the evaluation object, and the collection efficiency CE of the evaluation object is determined by the following formula.

Collection efficiency $CE$=[1−(particle concentration on downstream side)/(particle concentration on upstream side)]×100(%)

The transmittance $TR_1$ of the first PTFE porous membrane 11 is, for example, 10 to 90%. The lower limit of the transmittance $TR_1$ may be 15% or more, 20% or more, 24% or more, 30% or more, 35% or more, or even 40% or more. The upper limit of the transmittance $TR_1$ may be 80% or less, 70% or less, 60% or less, 50% or less, 44% or less, or even 40% or less.

The transmittance $TR_2$ of the second PTFE porous membrane 13 is, for example, 0.000001 to 5%. The upper limit of the transmittance $TR_2$ may be 1% or less, 0.5% or less, less than 0.5%, 0.25% or less, 0.15% or less, 0.11% or less, 0.1% or less, 0.01% or less, 0.001% or less, or even 0.0005% or less. The lower limit of the transmittance $TR_2$ may be 0.0001% or more.

A pressure loss $PL_1$ of the first PTFE porous membrane 11 is, for example, 1 to 150 Pa at a permeate flow rate of 5.3 cm/sec. The lower limit of the pressure loss $PL_1$ may be 10 Pa or more, 20 Pa or more, 30 Pa or more, or even 40 Pa or more. The upper limit of the pressure loss $PL_1$ may be 120 Pa or less, 100 Pa or less, 80 Pa or less, 60 Pa or less, or even 40 Pa or less.

A pressure loss $PL_2$ of the second PTFE porous membrane 13 is, for example, 50 to 500 Pa at a permeate flow rate of 5.3 cm/sec. The lower limit of the pressure loss $PL_2$ may be 75 Pa or more, 100 Pa or more, 110 Pa or more, 125 Pa or more, 150 Pa or more, or even 175 Pa or more. The upper limit of the pressure loss $PL_2$ may be 400 Pa or less, 350 Pa or less, 300 Pa or less, 250 Pa or less, 200 Pa or less, or even 180 Pa or less.

The pressure loss $PL_1$ of the first PTFE porous membrane 11 is commonly smaller than the pressure loss $PL_2$ of the second PTFE porous membrane 13. A ratio $PL_2/PL_1$ of the pressure loss $PL_2$ of the second PTFE porous membrane 13 to the pressure loss $PL_1$ of the first PTFE porous membrane 11 is, for example, 1.5 or more, and may be 2 or more, 2.75 or more, 3 or more, 4 or more, 4.5 or more, 5 or more, 7 or more, 8 or more, or even 9 or more. The upper limit of the ratio $PL_2/PL_1$ is, for example, 30 or less.

The pressure loss PL of each PTFE porous membrane can be measured in the following manner. The PTFE porous membrane serving as an evaluation object is set in a holder having a vent hole (having a circular shape and an effective area of 100 cm²) in such a manner that the membrane blocks the vent hole. Then, a pressure difference is generated between one face and the other face of the holder so that air will permeate through the evaluation object in the vent hole. The pressure difference is measured using a pressure meter (manometer) at a moment when the linear flow velocity measured using a flowmeter for the air permeating through the evaluation object becomes 5.3 cm/sec. The pressure difference as defined above is measured three times for one evaluation object, and the average of the measured values is employed as the pressure loss PL of the evaluation object.

A PF (Performance Factor) value of the first PTFE porous membrane 11 is, for example, less than 20, and may be 19 or less, 18 or less, 17.5 or less, or even 17 or less. The lower limit of the PF value of the first PTFE porous membrane 11 is, for example, 5 or more, and may be 8 or more, 10 or more, 12 or more, 13 or more, 14 or more, 15 or more, or even 15.2 or more. A PF value of the second PTFE porous membrane 13 is, for example, 15 or more, and may be 20 or more, 23 or more, 25 or more, 27 or more, 29 or more, or even 30 or more. The upper limit of the PF value of the second PTFE porous membrane 13 is, for example, 40 or less. The PF value of the first PTFE porous membrane 11 is commonly smaller than the PF value of the second PTFE porous membrane 13. A ratio of the PF value of the first PTFE porous membrane 11 to the PF value of the second PTFE porous membrane 13 is, for example, 0.9 or less, and may be 0.8 or less, 0.7 or less, or even 0.6 or less. The lower limit of the ratio of the PF values is, for example, 0.1 or more, and may be 0.3 or more, 0.36 or more, 0.4 or more, or even 0.5 or more.

The PF value of each PTFE porous membrane is a value determined by the following formula from the pressure loss PL (the unit of the pressure loss PL used to determine the PF value is mmH$_2$O) and the collection efficiency CE (unit: %) of the PTFE porous membrane:

$$PF \text{ value} = \{-\log[(100-CE)/100]/PL\} \times 100$$

The thickness of the first PTFE porous membrane 11 constituting the exposed surface 16 is, for example, 0.1 μm or more, and may be 1 μm or more, 2 μm or more, 5 μm or more, or even 10 μm or more. The upper limit of the thickness of the first PTFE porous membrane 11 is, for example, 50 μm or less. The thickness of the second PTFE porous membrane 13 sandwiched by the first air-permeable supporting member 12 and the second air-permeable supporting member 14 is, for example, 0.1 to 50 μm, and may be 1 to 10 μm, 5 to 10 μm, or even 6 to 9 μm.

The contact angle with water on the exposed surface 16 of the first PTFE porous membrane 11 may be less than 154° or 153° or less. The contact angle with water can be evaluated according to the sessile drop method defined in Japanese Industrial Standards (JIS) R 3257. JIS R 3257 defines a method for evaluation of the contact angle with water on a surface of a glass substrate. The contact angle with water on the exposed surface 16 can be evaluated according to the testing method and the test conditions defined therein. The contact angle is the average of values measured at five points on the evaluation surface. The volume of a water drop used for the evaluation is 2 μL.

The PTFE porous membranes 11 and 13 each may be formed of a single layer or of a plurality of layers.

The PTFE porous membranes 11 and 13 each can be obtained, for example, by shaping a mixture of an unsintered PTFE powder and a liquid lubricant into a sheet, for example, by extrusion and/or rolling, removing the liquid lubricant from the resulting unsintered sheet, and making the sheet porous by stretching. The stretching is typically biaxial stretching which is a combination of stretching of the sheet in the MD direction (longitudinal direction) and stretching of the sheet in the TD direction (width direction). In the biaxial stretching, it is preferable to perform the stretching in the MD direction first and then the stretching in the TD direction. The liquid lubricant is not limited as long as the liquid lubricant can wet the surfaces of the PTFE particles and be removed later. The liquid lubricant is, for example, a hydrocarbon oil such as naphtha, white oil, or liquid paraffin. Sintering in which the sheet is exposed to an atmosphere at a temperature equal to or higher than 327° C., which is the melting point of PTFE, may be performed at any timing after the removal of the liquid lubricant. The sintering may be performed simultaneously with the stretching. The sintering can enhance the strength of the PTFE porous membrane. The PTFE porous membranes having different transmittances can be obtained by controlling the conditions of manufacturing, typically the conditions of stretching, the PTFE porous membranes.

The first air-permeable supporting member 12 and the second air-permeable supporting member 14 have the function of reinforcing the PTFE porous membranes 11 and 13 to maintain the shape of the filter medium 1 and also have the function of protecting the second PTFE porous membrane 13 from external force. The air-permeable supporting members 12 and 14 are each formed of, for example, a non-woven fabric, a woven fabric, or a mesh formed of fibers such as short fibers or long fibers. The air-permeable supporting members 12 and 14 formed of the non-woven fabric are preferred because of their excellent air permeability, strength, flexibility, and workability. The air-permeable supporting members 12 and 14 commonly have higher air permeabilities in the thickness direction than those of the PTFE porous membranes 11 and 13.

Examples of the material forming the air-permeable supporting members 12 and 14 include: polyolefins such as polyethylene (PE) and polypropylene (PP); polyesters such as polyethylene terephthalate (PET); polyamides including aromatic polyamides; and composite materials thereof. The air-permeable supporting members 12 and 14 may include two or more of these materials. The material forming the air-permeable supporting members 12 and 14 is preferably a polyolefin and more preferably PE because, in that case, the air-permeable supporting members 12 and 14 have relatively strong joining strength to the PTFE porous membranes 11 and 13. When the material is a composite material of the above materials, a polyolefin, particularly PE, is preferably exposed to a surface of the air-permeable supporting members 12 and 14, the surface being joined to the PTFE porous membranes 11 and 13.

One example of the composite material that can form the air-permeable supporting members 12 and 14 is composite fibers having a core-sheath structure composed of a core and a sheath covering the core, the core and sheath being formed of different materials. For the composite fibers, the melting point of the material forming the sheath is preferably lower than the melting point of the material forming the core. The material forming the core is, for example, a polyester such as PET. The material forming the sheath is, for example, a polyolefin such as PE.

The average fiber diameter of the fibers that can form the air-permeable supporting members 12 and 14 is, for example, 1 to 50 μm, and may be 1 to 30 μm or 10 to 30 μm.

The mass per unit area of the air-permeable supporting members 12 and 14 is, for example, 20 to 70 g/m$^2$. The upper limit of the mass per unit area of the air-permeable supporting members 12 and 14 may be 50 g/m$^2$ or less, 40 g/m$^2$ or less, less than 40 g/m$^2$, or even 35 g/m$^2$ or less. The lower limit of the mass per unit area of the air-permeable supporting members 12 and 14 is, for example, 25 g/m$^2$ or more.

The configuration of the first air-permeable supporting member 12 and that of the second air-permeable supporting member 14 may be the same.

The air-permeable supporting members 12 and 14 each may be formed of a single layer or of a plurality of layers.

The thickness of the filter medium 1 is, for example, 50 to 1000 μm and may be 100 to 500 μm.

The mass per unit area of the filter medium 1 is, for example, 10 to 1000 g/m$^2$ and may be 30 to 500 g/m$^2$.

A transmittance $TR_F$ of the filter medium 1 is, for example, 5% or less, and may be 1% or less, 0.5% or less, 0.11% or less, 0.1% or less, less than 0.5%, 0.25% or less, 0.15% or less, 0.01% or less, 0.001% or less, or even 0.0005% or less. The lower limit of the transmittance $TR_F$ is, for example, 0.00001% or more, and may be 0.0001% or more.

The transmittance $TR_F$ of the filter medium 1 is a value determined by the following formula from collection efficiency $CE_F$ (unit: %) of the filter medium 1 measured using monodisperse DEHS particles having an average particle diameter of 0.1 μm at a permeate flow rate of 5.3 cm/sec. The collection efficiency $CE_F$ can be measured according to the same method as that for measuring the collection efficiencies $CE_1$ and $CE_2$ of the PTFE porous membranes 11 and 13 using the filter medium 1 as an evaluation object. The filter medium 1 is set to the holder such that the first PTFE porous membrane 11 is upstream with respect to the direction in which air permeates during measurement.

Transmittance $TR_F$ (%)=100−collection efficiency $CE_F$

A pressure loss $PL_F$ of the filter medium 1 is, for example, less than 300 Pa, and may be 250 Pa or less, 230 Pa or less, 220 Pa or less, 210 Pa or less, or even 200 Pa or less. The lower limit of the pressure loss $PL_F$ is, for example, 10 Pa or more. The pressure loss $PL_F$ can be measured according to the same method as that for measuring the pressure losses $PL_1$ and $PL_2$ of the PTFE porous membranes 11 and 13 using the filter medium 1 as an evaluation object. The filter medium 1 is set to the holder such that the first PTFE porous membrane 11 is upstream with respect to the direction in which air permeates during measurement.

A PF value of the filter medium 1 is, for example, 15 or more, and may be 19 or more, 20 or more, 22 or more, 24 or more, or even 25 or more. The PF value of the filter medium 1 is a value determined by the following formula from the pressure loss $PL_F$ (the unit of the pressure loss $PL_F$ used to determine the PF value is mmH$_2$O) and the collection efficiency $CE_F$ (unit: %) of the filter medium 1:

PF value=${-\log[(100-CE_F)/100]/PL_F}\times 100$

The filter medium 1 may be a filter medium for a high-efficiency particulate air grade (HEPA) filter as specified in Japanese Industrial Standards (JIS) Z 8122: 2000 or may be a filter medium for an ultra-low penetration air grade (ULPA) filter.

The filter medium 1 may further include a layer and/or a member other than the PTFE porous membranes 11 and 13 and the air-permeable supporting members 12 and 14 as long as having the laminate structure 15.

In the filter medium 1, the PTFE porous membranes 11 and 13 and the air-permeable supporting members 12 and 14 are joined to their adjacent one(s). The joining method is, for example, but not limited to thermal lamination or lamination using an adhesive. Joining by thermal lamination is preferred because, in that case, an increase in pressure loss at the joining interface can be reduced. The filter medium 1 can be formed, for example, by subjecting a laminate in which the first PTFE porous membrane 11, the first air-permeable supporting member 12, the second PTFE porous membrane 13, and the second air-permeable supporting member 14 are laminated in this order to any of various lamination methods such as thermal lamination.

The filter medium 1 is commonly used as an air-permeable filter allowing a gas such as air to permeate therethrough to remove a material to be filtered out, such as particles included in the gas. When used, the filter medium 1 is commonly disposed such that the first PTFE porous membrane 11 is upstream with respect to the flow of the gas including the material to be filtered out. Examples of the air-permeable filter include air filters for clean rooms and dust filters for electrical appliances such as vacuum cleaners and air purifiers. The filter medium 1 is particularly suitable for use as a dust filter because of its excellent reusability. However, the application of the filter medium 1 is not limited to the above examples.

[Filter Unit]

Figure 2:
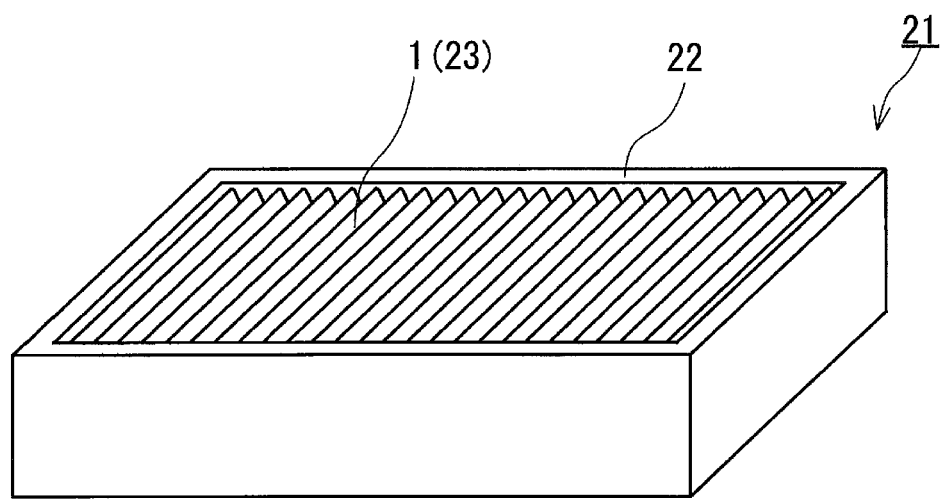
FIG. 2 is a perspective view schematically showing an example of an air filter unit of the present invention.

FIG. 2 shows an example of an air filter unit 21 of the present invention. The air filter unit 21 shown in FIG. 2 includes the filter medium 1 and a frame 22 supporting the filter medium 1. In the filter unit 21, the filter medium 1 is in a state of a filter pleat pack 23 which is pleated. In the filter pleat pack 23, the filter medium 1 is folded so as to have a series of W-shapes when viewed from the side. Pleating of the filter medium 1 can increase the amount of permeated gas while an increase in pressure loss of the filter unit 21 is reduced.

The frame 22 supports a peripheral portion of the filter pleat pack 23. The frame 22 is formed of, for example, a metal, a resin, or a composite material thereof. The configuration of the frame 22 can be the same as that of a frame included in conventional filter units.

The filter unit 21 may further include a member other than the air filter medium 1 and the frame 22. The member is, for example, a resin string generally called "bead." The bead is a kind of spacer for maintaining the shape of the pleated air filter medium 1. The bead is commonly disposed on a surface(s) of the folded air filter medium 1 to extend along a direction intersecting with the pleat line(s) (a mountain fold and/or a valley fold) of the air filter medium 1. The bead may be disposed on one surface of the air filter medium 1 or may be disposed on both surfaces thereof. The bead is preferably disposed not on the PTFE porous membrane but on the air-permeable supporting member. The beads can be formed, for example, by melting a resin and applying the resin in a string form. The resin is not limited and is, for example, a polyamide or a polyolefin.

The filter unit 21 is commonly used as an air-permeable filter unit allowing a gas such as air to permeate therethrough to remove a material to be filtered out, such as particles included in the gas. When used, the filter unit 21 is commonly disposed such that the first PTFE porous membrane 11 is upstream with respect to the flow of the gas including the material to be filtered out. Examples of the air-permeable filter unit include air filter units for clean rooms and dust filter units for electrical appliances such as vacuum cleaners and air purifiers. The filter unit 21 is particularly suitable for use as a dust filter unit because of its excellent reusability. However, the application of the filter unit 21 is not limited to the above examples.

The filter unit 21 can be formed by a known method using the filter medium 1. The pleating of the filter medium 1 can be accomplished, for example, by using a pleating machine to uninterruptedly fold the air filter medium 1 along mountain and valley folds alternately arranged in parallel on a surface of the air filter medium 1.

EXAMPLES

Hereinafter, the present invention will be described in more detail by way of examples. The present invention is not limited to the following examples.

First, methods for evaluating PTFE porous membranes and filter mediums produced in Examples and Comparative Examples will be described.

[Thickness]

The thicknesses of each PTFE porous membrane, each air-permeable supporting member, and each filter medium were evaluated using a digital dial gauge.

[Transmittance]

Transmittances of each PTFE porous membrane and each filter medium were evaluated in the following manner. First, the PTFE porous membrane or the filter medium serving as an evaluation object was set in a holder having a vent hole (having a circular shape and an effective area of 100 cm²) in such a manner that the evaluation object blocked the vent hole. Then, a pressure difference was generated between one face and the other face of the holder so that air would permeate through the evaluation object in the vent hole. Next, the pressure difference was adjusted so that the linear flow velocity measured using a flowmeter for the air permeating through the evaluation object would be maintained at 5.3 cm/sec. After that, monodisperse DEHS particles having an average particle diameter of 0.10 μm were introduced into the air permeating through the evaluation object at a concentration of $10^4$ particles/cm³ or more. The concentration of the DEHS particles included in the air having permeated through the evaluation object was measured using a particle counter disposed downstream of the evaluation object, and the collection efficiency (unit: %) of the evaluation object was determined by the following formula (1). Next, the transmittance of the evaluation object was determined from the collection efficiency by the following formula (2).

collection efficiency (%)=[1−(particle concentration on downstream side)/(particle concentration on upstream side)]×100   Formula (1):

transmittance (%)=100−collection efficiency   Formula (2):

[Pressure Loss]

Pressure losses of each PTFE porous membrane and each filter medium were evaluated in the following manner. First, the PTFE porous membrane or the filter medium serving as an evaluation object was set in a holder having a vent hole (having a circular shape and an effective area of 100 cm²) in such a manner that the evaluation object blocked the vent hole. Then, a pressure difference was generated between one face and the other face of the holder so that air would permeate through the evaluation object in the vent hole. The pressure difference was measured using a pressure meter (manometer) at a moment when the linear flow velocity measured using a flowmeter for the air permeating through the evaluation object became 5.3 cm/sec. The pressure difference as defined above was measured three times for one evaluation object, and the average of the measured values was employed as the pressure loss of the evaluation object.

[Pf Value]

PF values of each PTFE porous membrane and each filter medium were determined by the following formula from their pressure losses PL (the unit of the pressure loss PL used to determine the PF values is mmH₂O) and their collection efficiencies CE (unit: %).

PF value={−log[(100−CE)/100]/PL}×100

[Washability]

Washability of each filter medium was evaluated as follows. First, each filter medium serving as an evaluation object was cut to a 47-mm-diameter circular shape to obtain a specimen. Next, 0.2 g of "Class 8 Kanto loam soil," which is a test powder described in JIS Z 8901, were evenly put over an exposed surface of a first PTFE porous membrane (Examples 1 to 3 and Comparative Example 1) or an exposed surface of an air-permeable supporting member (Comparative Example 2) of the specimen, and was then sucked from the other side of the specimen at a linear velocity of 20 cm/sec for 60 seconds. The surface where the powder was placed was held vertically, and the powder was washed away by pouring about 10 mL of water in a wash bottle all over the surface. Then, the pressure loss $PL_F$ of the filter medium was evaluated. The filter medium was rated as "○ (good)" when the difference between the resulting pressure loss $PL_F$ and the pressure loss $PL_F$ obtained before the powder was placed was less than 20%, and the filter medium was rated as "x (poor)" when the difference is 20% or more.

[Durability Test]

A durability test of each filter medium was performed as follows. First, the filter medium yet to be subjected to the durability test was measured for its transmittance (transmittance before the durability test) $TR_{F1}$. Next, the durability test was performed in which a toothbrush was pressed against the exposed surface of the first PTFE porous membrane (Examples 1 to 3 and Comparative Example 1) or the exposed surface of the air-permeable supporting member (Comparative Example 2) of the filter medium and then 50 back-and-forth strokes were made with the toothbrush pressed against the exposed surface. Then, the filter medium subjected to the durability test was measured for its transmittance (transmittance after the durability test) $TR_{F2}$. A ratio of the transmittance $TR_{F2}$ after the durability test to the transmittance $TR_F1$ value before the durability test was determined. The filter medium was rated as "○ (good)" when the ratio is 10 or less, and the filter medium was rated as "x (poor)" when the ratio is more than 10.

Production Example 1

100 parts by weight of a PTFE fine powder (POLYFLON (registered trademark) PTFE F-104 manufactured by DAIKIN INDUSTRIES, LTD.) and 20 parts by weight of dodecane serving as a liquid lubricant were uniformly mixed to obtain a mixture. Next, the mixture was extruded into a rod shape using an extruder and then passed between a pair of metal pressure rolls to obtain a strip-shaped PTFE sheet (having a thickness of 200 μm). The PTFE sheet was then held in an atmosphere at 150° C. to remove the liquid lubricant. Subsequently, the PTFE sheet was stretched in the longitudinal direction at a stretching temperature of 280° C. and a stretching ratio of 85 and was then stretched in the width direction at a stretching temperature of 150° C. and a stretching ratio of 200. Furthermore, the stretched PTFE sheet was heated by hot air at 500° C. with the dimensions of the stretched PTFE sheet fixed. A PTFE porous membrane A was thus obtained. The PTFE porous membrane A had a thickness of 2 μm, a transmittance of 44%, and a pressure loss of 20 Pa.

Production Example 2

100 parts by weight of a PTFE fine powder (Fluon (registered trademark) CD129E manufactured by AGC Inc.) and 20 parts by weight of dodecane serving as a liquid lubricant were uniformly mixed to obtain a mixture. Next, the mixture was extruded into a rod shape using an extruder and then passed between a pair of metal pressure rolls to obtain a strip-shaped PTFE sheet (having a thickness of 200 μm). The PTFE sheet was then held in an atmosphere at 150° C. to remove the liquid lubricant. Subsequently, the PTFE sheet was stretched in the longitudinal direction at a stretching temperature of 375° C. and a stretching ratio of 20 in the first stage and a stretching ratio of 4.5 in the second stage, and was then stretched in the width direction at a stretching temperature of 150° C. and a stretching ratio of 6. A PTFE porous membrane B was thus obtained. The PTFE porous membrane B had a thickness of 12 μm, a transmittance of 24%, and a pressure loss of 40 Pa.

Production Example 3

100 parts by weight of a PTFE fine powder (POLYFLON (registered trademark) PTFE F-104 manufactured by DAI- KIN INDUSTRIES, LTD.) and 20 parts by weight of dodecane serving as a liquid lubricant were uniformly mixed to obtain a mixture. Next, the mixture was extruded into a rod shape using an extruder and then passed between a pair of metal pressure rolls to obtain a strip-shaped PTFE sheet (having a thickness of 200 μm). The PTFE sheet was then held in an atmosphere at 150° C. to remove the liquid lubricant. Subsequently, the PTFE sheet was stretched in the longitudinal direction at a stretching temperature of 280° C. and a stretching ratio of 18 and was then stretched in the width direction at a stretching temperature of 120° C. and a stretching ratio of 35. Furthermore, the stretched PTFE sheet was heated by hot air at 500° C. with the dimensions of the stretched PTFE sheet fixed. A PTFE porous membrane C was thus obtained. The PTFE porous membrane C had a thickness of 9 μm, a transmittance of 0.00022%, and a pressure loss of 180 Pa.

Production Example 4

100 parts by weight of a PTFE fine powder (POLYFLON (registered trademark) PTFE F-104 manufactured by DAIKIN INDUSTRIES, LTD.) and 20 parts by weight of dodecane serving as a liquid lubricant were uniformly mixed to obtain a mixture. Next, the mixture was extruded into a rod shape using an extruder and then passed between a pair of metal pressure rolls to obtain a strip-shaped PTFE sheet (having a thickness of 200 μm). The PTFE sheet was then held in an atmosphere at 150° C. to remove the liquid lubricant. Subsequently, the PTFE sheet was stretched in the longitudinal direction at a stretching temperature of 280° C. and a stretching ratio of 20 and was then stretched in the width direction at a stretching temperature of 120° C. and a stretching ratio of 35. Furthermore, the stretched PTFE sheet was heated by hot air at 500° C. with the dimensions of the stretched PTFE sheet fixed. A PTFE porous membrane D was thus obtained. The PTFE porous membrane D had a thickness of 6 μm, a transmittance of 0.054%, and a pressure loss of 110 Pa.

Example 1

The PTFE porous membrane A, the PTFE porous membrane C, and PET-PE composite fiber non-woven fabrics (ELEVES S0303WDO manufactured by UNITIKA LTD. and having a thickness of 210 μm) were used as a first PTFE porous membrane, a second PTFE porous membrane, and air-permeable supporting members, respectively. These were joined together by thermal lamination using a hot roll set at 130° C. to obtain a filter medium having a four-layer structure composed of "first PTFE porous membrane/air-permeable supporting member/second PTFE porous membrane/air-permeable supporting member."

Example 2

A filter medium having a four-layer structure composed of "first PTFE porous membrane/air-permeable supporting member/second PTFE porous membrane/air-permeable supporting member" was obtained in the same manner as in Example 1, except that the PTFE porous membrane B was used as the first PTFE porous membrane.

Example 3

A filter medium having a four-layer structure composed of "first PTFE porous membrane/air-permeable supporting member/second PTFE porous membrane/air-permeable supporting member" was obtained in the same manner as in Example 2, except that the PTFE porous membrane D was used as the second PTFE porous membrane.

Comparative Example 1

The PTFE porous membranes D were used as first and second PTFE porous membranes and PET-PE composite fiber non-woven fabrics (ELEVES T0303WDO manufactured by UNITIKA LTD. and having a thickness of 160 μm) were used as air-permeable supporting members. These were joined together by thermal lamination using a hot roll set at 130° C. to obtain a filter medium having a four-layer structure composed of "first PTFE porous membrane/air-permeable supporting member/second PTFE porous membrane/air-permeable supporting member."

Comparative Example 2

The PTFE porous membranes D were used as first and second PTFE porous membranes and PET-PE composite fiber non-woven fabrics (ELEVES T0303WDO manufactured by UNITIKA LTD. and having a thickness of 160 μm) were used as air permeable supporting members. These were joined together by thermal lamination using a hot roll set at 130° C. to obtain a filter medium having a five-layer structure composed of "air-permeable supporting member/first PTFE porous membrane/air-permeable supporting member/second PTFE porous membrane/air-permeable supporting member."

The evaluation results are collectively shown in Table 1 below.

TABLE 1

| | | Example 1 | Example 2 | Example 3 | Comparative Example 1 | Comparative Example 2 |
|---|---|---|---|---|---|---|
| First PTFE porous membrane | Pressure loss (Pa) | 20 | 40 | 40 | 110 | 110 |
| | Transmittance $TR_1$ (%) | 44 | 24 | 24 | 0.054 | 0.054 |
| | PF value ($PF_1$) | 17.5 | 15.2 | 15.2 | 29.1 | 29.1 |
| Second PTFE porous membrane | Pressure loss (Pa) | 180 | 180 | 110 | 110 | 110 |
| | Transmittance $TR_2$ (%) | 0.00022 | 0.00022 | 0.054 | 0.054 | 0.054 |
| | PF value ($PF_2$) | 30.8 | 30.8 | 29.1 | 29.1 | 29.1 |
| Transmittance ratio $TR_1/TR_2$ | | 200000 | 110000 | 440 | 1 | 1 |
| PF value ratio $PF_1/PF_2$ | | 0.57 | 0.49 | 0.52 | 1 | 1 |
| Filter medium | Pressure loss (Pa) | 200 | 220 | 150 | 220 | 220 |

TABLE 1-continued

|  | Example 1 | Example 2 | Example 3 | Comparative Example 1 | Comparative Example 2 |
|---|---|---|---|---|---|
| Transmittance $TR_F$ (%) | 0.00025 | 0.00029 | 0.11 | 0.00013 | 0.00018 |
| PF value | 27.5 | 24.7 | 19.3 | 26.2 | 25.6 |
| Washability | ○ | ○ | ○ | ○ | x |
| Durability test [1*)] | ○ (1) | ○ (1.7) | ○ (1.9) | x (147) | ○ (1) |

[1*)] The parenthesized values are the ratios of the transmittance $TR_{F2}$ values of the filter mediums subjected to the durability test to the transmittance $TR_{F1}$ values of the filter mediums yet to be subjected to the durability test.

INDUSTRIAL APPLICABILITY

The filter medium of the present invention can be used in the same applications as conventional filter mediums. The filter medium of the present invention is used, for example, as a filter medium for air-permeable filters for electrical appliances such as vacuum cleaners and air purifiers.

The invention claimed is:

1. A filter medium comprising:
a first polytetrafluoroethylene (PTFE) porous membrane;
a first air-permeable supporting member having a mass per unit area of 20 to 70 g/m²;
a second PTFE porous membrane; and
a second air-permeable supporting member having a mass per unit area of 20 to 70 g/m², wherein
the filter medium has a laminate structure composed of the first PTFE porous membrane, the first air-permeable supporting member, the second PTFE porous membrane, and the second air-permeable supporting member laminated in this order, and
the first PTFE porous membrane constitutes an exposed surface of the filter medium,
a thickness of the first PTFE porous membrane is 2 μm or more and 12 μm or less,
a thickness of the second PTFE porous membrane is 6 μm or more and 9 μm or less,
wherein the thickness of the one of the first PTFE porous membrane and the second PTFE porous membrane having the larger thickness is defined as a larger thickness ($T_1$),
wherein the thickness of the other of the first PTFE porous membrane and the second PTFE porous membrane having the smaller thickness is defined as a smaller thickness ($T_2$), and
wherein $T_2$ divided by $T_1$ satisfies the following inequity:

$$0.22 \leq T_2/T_1 \leq 0.75, \text{ and}$$

a thickness of the filter medium is more than 420 μm and 450 μm or less,
an average fiber diameter of the first air-permeable supporting member is 10 to 30 μm,
an average fiber diameter of the second air-permeable supporting member is 10 to 30 μm, and
a ratio $TR_1/TR_2$ of a transmittance $TR_1$ of the first PTFE porous membrane to a transmittance $TR_2$ of the second PTFE porous membrane is 100 or more and 5000000 or less,
where the transmittance $TR_1$ and the transmittance $TR_2$ are values determined by the following formulae from, respectively, collection efficiency $CE_1$ (unit: %) of the first PTFE porous membrane and collection efficiency $CE_2$ (unit: %) of the second PTFE porous membrane measured using monodisperse dioctyl sebacate particles having an average particle diameter of 0.1 μm at a permeate flow rate of 5.3 cm/sec:

transmittance $TR_1$ (%)=100−collection efficiency $CE_1$;

transmittance $TR_2$ (%)=100−collection efficiency $CE_2$; and wherein a transmittance $TR_F$ of the filter medium is 5% or less,
where the transmittance $TR_F$ is a value determined by the following formula from collection efficiency $CE_F$ (unit: %) of the filter medium measured using monodisperse dioctyl sebacate particles having an average particle diameter of 0.1 μm at a permeate flow rate of 5.3 cm/sec:

transmittance $TR_F$ (%)=100−collection efficiency $CE_F$.

2. The filter medium according to claim 1, wherein the ratio $TR_1/TR_2$ is 300 or more.

3. The filter medium according to claim 1, wherein the transmittance $TR_F$ of the filter medium is less than 0.5%.

4. The filter medium according to claim 1, wherein a pressure loss $PL_F$ of the filter medium is less than 300 Pa at a permeate flow rate 5.3 cm/sec.

5. A filter unit comprising:
the filter medium according to claim 1; and
a frame supporting the filter medium.

6. The filter medium according to claim 1, wherein the ratio $TR_1/TR_2$ of the transmittance $TR_1$ of the first PTFE porous membrane to the transmittance $TR_2$ of the second PTFE porous membrane is 440 or more and 200,000 or less.

* * * * *